United States Patent
He et al.

(10) Patent No.: US 9,909,009 B2
(45) Date of Patent: Mar. 6, 2018

(54) ENVIRONMENTAL COLD-MIX ADJUSTABLE-MODULUS PAVEMENT MATERIAL AND MANUFACTURING METHOD THEREOF

(71) Applicant: Shenzhen Traffic Construction Engineering Test & Detection Center, Shenzhen (CN)

(72) Inventors: Guiping He, Shenzhen (CN); Zheng Sun, Shenzhen (CN); Xixi Hou, Shenzhen (CN); Quncong Qiu, Shenzhen (CN); Zhisong Huang, Shenzhen (CN); Xiaohua Jiang, Shenzhen (CN); Hua Chen, Shenzhen (CN)

( * ) Notice: Subject to any disclaimer, the term of this patent is extended or adjusted under 35 U.S.C. 154(b) by 259 days.

(21) Appl. No.: 14/860,710

(22) Filed: Sep. 22, 2015

(65) Prior Publication Data

US 2016/0145435 A1 May 26, 2016

(30) Foreign Application Priority Data

Nov. 28, 2014 (CN) .......................... 2014 1 0708868

(51) Int. Cl.
*C08L 95/00* (2006.01)
(52) U.S. Cl.
CPC .................................... *C08L 95/00* (2013.01)
(58) Field of Classification Search
None
See application file for complete search history.

(56) References Cited

U.S. PATENT DOCUMENTS

| 5,096,494 A * | 3/1992 | Schilling | C08K 5/092 106/246 |
| 5,178,674 A * | 1/1993 | Schilling | C07C 55/02 106/277 |
| 5,744,229 A * | 4/1998 | Gleason | B29C 70/12 428/297.4 |
| 5,925,695 A * | 7/1999 | Ohtsuka | C08L 63/08 264/331.13 |
| 2006/0089431 A1* | 4/2006 | Kawakami | C08L 95/00 524/59 |
| 2016/0208140 A1* | 7/2016 | He | C09D 195/005 |

* cited by examiner

*Primary Examiner* — Megan McCulley
(74) *Attorney, Agent, or Firm* — Wayne & Ken, LLC; Tony Hom

(57) ABSTRACT

An environmental protection cold mixing type modulus-adjustable pavement material and preparation method thereof. Equal components of waterborne epoxy resin and waterborne curing agent are added in a container to obtain a waterborne epoxy resin mixture. Emulsified bitumen, the waterborne epoxy resin mixture, an emulsifying agent, a defoaming agent and a stabilizing agent are prepared according to a certain mass ratio; the emulsified bitumen is first added in the container, and the pH is regulated with hydrochloric acid to be 5.0 to 6.5; the above-mentioned other materials are added and stirred to make mixed liquid; a stator of a high-speed shearing machine is put into the mixed liquid, and the rotational speed is set as 350 to 500 rpm for about 20 to 40 min to obtain waterborne epoxy emulsified bituminous emulsion. B. Coarse aggregate, fine aggregate, fillers, cement and the waterborne epoxy emulsified bitumen obtained from the above-mentioned preparation are selected in proportion; and after the coarse aggregate, the fine aggregate and rubber powder are added in a stirring machine of asphalt mixture and stirred and the waterborne epoxy emulsified bitumen is added and stirred, the cement is added and stirred.

5 Claims, No Drawings

ENVIRONMENTAL COLD-MIX ADJUSTABLE-MODULUS PAVEMENT MATERIAL AND MANUFACTURING METHOD THEREOF

CROSS-REFERENCE TO RELATED APPLICATIONS

This application is a continuation in part of, and claims priority to, Chinese Patent Application No. 201410708868.7 with a filing date of Nov. 28, 2014. The contents of all of the aforementioned application, including any intervening amendments thereto, are incorporated herein by reference.

TECHNICAL FIELD

The present invention relates to an environmental protection cold mixing type modulus-adjustable pavement material and preparation method thereof, applicable to flexible base layers and bituminous surface layers of all grades of pavements.

TECHNICAL BACKGROUND

In recent years, the design of the composite structure of a bituminous pavement in China is often finished based on utilization experience. The checking computation of the design of pavement deflection for characterizing the pavement bearing capability is often realized by an inverse method. The premise of the inverse method is that the modulus of each structural layer material is a fixed value. However, the test of the mechanical property of the material often indicates that the modulus of the material is greatly fluctuated along with the differences of the material properties and composition designs. To satisfy the deflection design, a high-strength semi-rigid base layer will be adopted by numerous construction companies. The modulus of the high-strength semi-rigid base layer greatly exceeds a recommended value of a design specification, which also causes that the rebound deflection of each structural layer satisfies the design requirement in the acceptance process of the current bituminous pavement. However, the bituminous pavement generates the damage of reflection of cracks, ruts and the like in the early service process.

It is believed from the current theoretical and practical studies that the reason for generating such damage is inadequate high temperature stability of the bituminous surface layer. Therefore, various measures for improving the high temperature performance of the bituminous surface layer arise at the historic moment, mainly including high-performance SBS modified bituminous mixture, high-modulus bituminous mixture, etc. However, with the continuous increase of road grades and vehicle speed, the growth of traffic and the increase of axle load in recent years, the early damage of the pavement still does not obtain an expected improvement effect. The reason for this is not just inadequate high temperature stability of the bituminous surface layer material, but excessively large rigidity of the semi-rigid base layer and mismatching with the modulus of the bituminous surface layer. With the increase of the modulus of the semi-rigid base layer, the tensile stress between bituminous pavement layers is increased, which is easy to cause early shear damage to the bituminous pavement. In order to solve the mismatching problem between the modulus of the semi-rigid base layer and the modulus of the bituminous surface layer material, two measures of installing a structural layer between both of the moduli and increasing the modulus of the entire bituminous surface layer material can be taken.

SUMMARY OF THE PRESENT INVENTION

The purpose of the present invention is to provide an environmental protection cold mixing type modulus-adjustable pavement material with low volatility, cold mixing, good high and low temperature performance and adjustable modulus, and preparation method thereof.

The purpose of the present invention is achieved by that:

An environmental protection cold mixing type modulus-adjustable pavement material, characterized by comprising the following mass ratios of materials:

| | |
|---|---|
| Coarse aggregate: | 100 |
| Fine aggregate: | 60 to 80 |
| Fillers: | 8 to 12 |
| Cement: | 4 to 8 |
| Waterborne epoxy emulsified bitumen: | 8 to 16 |

The waterborne epoxy emulsified b men comprises the following mass ratios of materials:

| | |
|---|---|
| Emulsified bitumen | 100 |
| Waterborne epoxy resin mixture | 4 to 20 |
| Emulsifying agent | 0.6 to 1.4 |
| Defoaming agent | 0.1 to 0.6 |
| Stabilizing agent | 0.6 to 2.0 |

The coarse aggregate is diorite, basalt, diabase, granite or limestone; the fine aggregate is diorite, basalt, diabase, granite or limestone; and the fillers are rubber powder.

A preparation method for the environmental protection cold mixing type modulus-adjustable pavement material of claim 1, characterized by comprising the following steps:

A. Preparation of the Waterborne Epoxy Emulsified Bitumen

According to the mass ratio of waterborne epoxy resin to a waterborne curing agent=100:100, the waterborne epoxy resin and the waterborne curing agent are selected for standby. The waterborne epoxy resin and the waterborne curing agent are simultaneously added in a container, and manually stirred continuously for 2 to 4 min to obtain the waterborne epoxy resin mixture.

| | |
|---|---|
| According to the mass ratios: Emulsified bitumen | 100 |
| Waterborne epoxy resin mixture | 4 to 20 |
| Emulsifying agent | 0.6 to 1.4 |
| Defoaming agent | 0.1 to 0.6 |
| Stabilizing agent | 0.6 to 2.0 |

The emulsified bitumen and the waterborne epoxy resin mixture, the emulsifying agent, the defoaming agent and the stabilizing agent obtained from the above-mentioned preparation are selected for standby.

The emulsified bitumen is first added in the container, and the pH is regulated with hydrochloric acid to be 5.0 to 6.5; and the waterborne epoxy resin mixture, the emulsifying agent, the defoaming agent and the stabilizing agent are mutually stirred and added simultaneously, and continuously mutually stirred for 1 to 3 min until the mixed liquid is uniform.

A stator of a high-speed shearing machine is put into the mixed liquid, and the rotational speed is set as 350 to 500 rpm; and a switch is enabled to perform shearing for about 20 to 40 min to obtain waterborne epoxy emulsified bituminous emulsion.

B. Preparation of the Environmental Protection Cold Mixing Type Modulus-Adjustable Pavement Material

| According to the mass ratios: Coarse aggregate | 100 |
|---|---|
| Fine aggregate | 60 to 80 |
| Fillers | 8 to 12 |
| Cement | 4 to 8 |
| Waterborne epoxy emulsified bitumen | 8 to 16 |

The coarse aggregate, the fine aggregate, the fillers, the cement and the waterborne epoxy emulsified bitumen which is obtained from the above-mentioned preparation are selected for standby.

The coarse aggregate, the fine aggregate and the rubber powder are added in a stirring machine of the bituminous mixture and stirred for 60 to 90 s. After the waterborne epoxy emulsified bitumen is added, it is stirred for 60 to 90 s. Finally, the cement is added and stirred for 60 to 90 s to obtain the environmental protection cold mixing type modulus-adjustable pavement material.

The waterborne epoxy resin is waterborne epoxy resin HTW-608 or waterborne epoxy resin HTW-609 or waterborne epoxy resin GEM03 or waterborne epoxy resin GEM02.

The waterborne curing agent is waterborne curing agent HTW-208 or waterborne curing agent GCA01 or waterborne curing agent GCA02.

The emulsified bitumen is cation medium-breaking emulsified bitumen or cation slow-breaking emulsified bitumen.

The emulsifying agent is BH-Z2 type emulsifying agent or BH-MM type emulsifying agent.

The defoaming agent is an ammonium salt cation surface active agent.

The stabilizing agent is polyvinyl alcohol or glycol.

The coarse aggregate is diorite or basalt or diabase or granite or limestone, having a maximum nominal grain size of 26.5 mm. The fine aggregate is diorite or basalt or diabase or granite or limestone, having a maximum nominal grain size of 4.75 mm. The rubber powder is rubber powder of 40 to 80 meshes. The cement is P.O32.5 or P.O42.5 ordinary portland cement.

In the present invention, based on the cold mixing bituminous mixture, the modulus and the utilization performance of the cold mixing bituminous mixture are comprehensively regulated through the modification of the waterborne epoxy resin and the incorporation of the cement and part of rubber powder. In the process of preparing the waterborne epoxy emulsified bitumen, the waterborne epoxy resin and the waterborne curing agent generate part of curing reaction, and part of curing products are uniformly dispersed in bituminous emulsion through the synergistic effect of the defoaming agent, the stabilizing agent and the emulsifying agent. After the waterborne epoxy emulsified bitumen is stirred with the aggregate, a demulsification reaction is started. Under the catalysis of the hydration reaction of the cement, the demulsification reaction may be accelerated. At this moment, the curing reaction of the waterborne epoxy resin, the hydration reaction of the cement and the demulsification reaction act together to form a cementation system using bituminous base material as a base body and having waterborne epoxy resin curing products and cement hydration products interweaved and intergrown therein. Compared with the bituminous base material, the waterborne epoxy resin curing products and the cement hydration products have higher strength and play the action of adjusting the modulus in the overall material system.

The present invention has the beneficial effect that through the synergistic effect of the curing of the waterborne epoxy resin, cement hydration and the like, the utilization performance of the cold mixing bituminous mixture is ensured and simultaneously, the modulus of the overall material can be adjusted. If used as a flexible base layer, the material has higher modulus than a conventional flexible base material, thereby reducing a modulus difference between the material and a stable subbase layer of the cement, reducing tensile stress between the layers and alleviating crack reflection; and if used as a bituminous surface layer material, the material also has higher modulus than a general bituminous mixture, thereby reducing the modulus difference between the material and a semi-rigid base layer, reducing the tensile stress between the layers, playing the action of alleviating the crack reflection, simultaneously obviously enhancing the high temperature stability of the material through thermosetting epoxy resin material and effectively preventing the damage of ruts. In summary, the novel pavement material prepared by the present invention has the features of low VOC (volatile organic compound), cold mixing, good high and low temperature performance and adjustable modulus.

The preparation method of the material of the present invention can be finished without the need of special equipment, can be realized at normal temperature and normal pressure, and is convenient for industrialized production and application.

DETAILED DESCRIPTION OF THE PRESENT INVENTION

Embodiment 1

1) Preparation of the Waterborne Epoxy Emulsified Bitumen

According to the mass ratio of waterborne epoxy resin to a waterborne curing agent=100:100, the waterborne epoxy resin and the waterborne curing agent are selected for standby. The waterborne epoxy resin and the waterborne curing agent are simultaneously added in a container, and manually stirred continuously for 2 min to obtain a waterborne epoxy resin mixture.

According to the mass ratio of emulsified bitumen to the waterborne epoxy resin mixture to an emulsifying agent to a defoaming agent to a stabilizing agent=100:4:0.6:0.1:0.6, the emulsified bitumen and the waterborne epoxy resin mixture, the emulsifying agent, the defoaming agent and the stabilizing agent obtained from the above-mentioned preparation are selected for standby. The emulsified bitumen is first added in the container, and the pH is regulated with hydrochloric acid to be 5.0; and the waterborne epoxy resin mixture, the emulsifying agent, the defoaming agent and the stabilizing agent are mutually stirred and added simultaneously, and mutually stirred continuously for 1 min until the mixed liquid is uniform. A stator of a high-speed shearing machine is put into the mixed liquid, and the rotational speed is regulated as 350 rpm; and a switch is enabled to perform shearing for about 20 min to obtain waterborne epoxy emulsified bituminous emulsion. (Note: The storage time of the prepared emulsion shall not exceed 6 hrs)

2) Preparation of the Environmental Protection Cold Mixing Type Modulus-Adjustable Pavement Material According to the mass ratio of coarse aggregate to fine aggregate to fillers to cement to waterborne epoxy emulsified bitumen=100:60:8:4:8, the coarse aggregate, the fine aggregate, the fillers, the cement and the waterborne epoxy emulsified bitumen which is obtained from the above-mentioned preparation are selected for standby.

The coarse aggregate, the fine aggregate and the rubber powder are added in a stirring machine of the bituminous mixture and stirred for 60 s. After the waterborne epoxy emulsified bitumen is added, it is stirred for 60 s. Finally, the cement is added and stirred for 60 s to obtain the environmental protection cold mixing type modulus-adjustable pavement material.

The waterborne epoxy resin is waterborne epoxy resin GEM03 produced by Shanghai Lvjia Waterborne Coating Co., Ltd.

The waterborne curing agent is waterborne curing agent GCA01 produced by Shanghai Lvjia Waterborne Coating Co., Ltd.

The emulsified bitumen is cation medium-breaking emulsified bitumen produced by Tipco Asphalt (Public) Company Limited.

The emulsifying agent is BH-Z2 type emulsifying agent or BH-MM type emulsifying agent.

The defoaming agent is an ammonium salt cation surface active agent produced by Henan Daochun Chemical Technology Co., Ltd.

The stabilizing agent is polyvinyl alcohol.

The coarse aggregate is diorite, having a maximum nominal grain size of 26.5 mm.

The fine aggregate is diorite, having a maximum nominal grain size of 4.75 mm.

The rubber powder is rubber powder of 40 meshes.

The cement is P.O32.5 ordinary portland cement.

Embodiment 2

1) Preparation of the Waterborne Epoxy Emulsified Bitumen

According to the mass ratio of waterborne epoxy resin to a waterborne curing agent=100:100, the waterborne epoxy resin and the waterborne curing agent are selected for standby. The waterborne epoxy resin and the waterborne curing agent are simultaneously added in a container, and manually stirred continuously for 3 min to obtain a waterborne epoxy resin mixture.

According to the mass ratio of the emulsified bitumen to the waterborne epoxy resin mixture to an emulsifying agent to a defoaming agent to a stabilizing agent=100:8.0:0.9:0.2:0.9, the emulsified bitumen and the waterborne epoxy resin mixture, the emulsifying agent, the defoaming agent and the stabilizing agent obtained from the above-mentioned preparation are selected for standby. The emulsified bitumen is first added in the container, and the pH is regulated with hydrochloric acid to be 5.5; and the waterborne epoxy resin mixture, the emulsifying agent, the defoaming agent and the stabilizing agent are mutually stirred and added simultaneously, and mutually stirred continuously for 2 min until the mixed liquid is uniform. A stator of a high-speed shearing machine is put into the mixed liquid, and the rotational speed is regulated as 400 rpm; and a switch is enabled to perform shearing for about 25 min to obtain waterborne epoxy emulsified bituminous emulsion. (Note: The storage time of the prepared emulsion shall not exceed 6 h)

2) Preparation of the Environmental Protection Cold Mixing Type Modulus-Adjustable Pavement Material According to the mass ratio of coarse aggregate to fine aggregate to fillers to cement to waterborne epoxy emulsified bitumen=100.65:9:5:10, the coarse aggregate, the fine aggregate, the fillers, the cement and the waterborne epoxy emulsified bitumen which is obtained from the above-mentioned preparation are selected for standby.

The coarse aggregate, the fine aggregate and the rubber powder are added in a stirring machine of the bituminous mixture and stirred for 60 s. After the waterborne epoxy emulsified bitumen is added, it is stirred for 60 s. Finally, the cement is added and stirred for 60 s to obtain the environmental protection cold mixing type modulus-adjustable pavement material.

The waterborne epoxy resin is waterborne epoxy resin GEM02 produced by Shanghai Lvjia Waterborne Coating Co., Ltd.

The waterborne curing agent is waterborne curing agent GCA02 produced by Shanghai Lvjia Waterborne Coating Co., Ltd The emulsified bitumen is cation medium-breaking emulsified bitumen produced by Tipco Asphalt (Public) Company Limited.

The emulsifying agent is BH-Z2 type emulsifying agent or BH-MM type emulsifying agent.

The defoaming agent is an ammonium salt cation surface active agent produced by Henan Daochun Chemical Technology Co., Ltd.

The stabilizing agent is polyvinyl alcohol.

The coarse aggregate is diabase, having a maximum nominal grain size of 26.5 mm.

The fine aggregate is diabase, having a maximum nominal grain size of 4.75 mm.

The rubber powder is rubber powder of 50 meshes.

The cement is P.O42.5 ordinary portland cement.

Embodiment 3

1) Preparation of the Waterborne Epoxy Emulsified Bitumen

According to the mass ratio of waterborne epoxy resin to a waterborne curing agent=100:100, the waterborne epoxy resin and the waterborne curing agent are selected for standby. The waterborne epoxy resin and the waterborne curing agent are simultaneously added in a container, and manually stirred continuously for 3 min to obtain a waterborne epoxy resin mixture.

According to the mass ratio of emulsified bitumen to the waterborne epoxy resin mixture to an emulsifying agent to a defoaming agent to a stabilizing agent=100:12:1.0:0.4:1.3, the emulsified bitumen and the waterborne epoxy resin mixture, the emulsifying agent, the defoaming agent and the stabilizing agent obtained from the above-mentioned preparation are selected for standby. The emulsified bitumen is first added in the container, and the pH is regulated with hydrochloric acid to be 6.0; and the waterborne epoxy resin mixture, the emulsifying agent, the defoaming agent and the stabilizing agent are mutually stirred and added simultaneously, and mutually stirred continuously for 2 min until the mixed liquid is uniform. A stator of a high-speed shearing machine is put into the mixed liquid, and the rotational speed is regulated as 350 rpm, and a switch is enabled to perform shearing for about 30 min to obtain waterborne epoxy emulsified bituminous emulsion. (Note: The storage time of the prepared emulsion shall not exceed 6 hrs)

2) Preparation of the Environmental Protection Cold Mixing Type Modulus-Adjustable Pavement Material According to the mass ratio of coarse aggregate to fine aggregate to fillers to cement to waterborne epoxy emulsified bitumen=100:75:10:7:13, the coarse aggregate, the fine aggregate, the fillers, the cement and the waterborne epoxy emulsified bitumen which is obtained from the above-mentioned preparation are selected for standby.

The coarse aggregate, the fine aggregate and the rubber powder are added in a stirring machine of the bituminous mixture and stirred for 80 s. After the waterborne epoxy emulsified bitumen is added, it is stirred for 80 s. Finally, the cement is added and stirred for 80 s to obtain the environmental protection cold mixing type modulus-adjustable pavement material.

The waterborne epoxy resin is waterborne epoxy resin HTW-608 produced by Suzhou Sirgel Specialty Resins Co., Ltd.

The waterborne curing agent is waterborne curing agent HTW-208 produced by Suzhou Sirgel Specialty Resins Co., Ltd.

The emulsified bitumen is cation slow-breaking emulsified bitumen produced by Tipco Asphalt (Public) Company Limited.

The emulsifying agent is BH-MM type emulsifying agent.

The defoaming agent is an ammonium salt cation surface active agent produced by Henan Daochun Chemical Technology Co., Ltd.

The stabilizing agent is glycol.

The coarse aggregate is basalt, having a maximum nominal grain size of 26.5 mm.

The fine aggregate is basalt, having a maximum nominal grain size of 4.75 mm.

The rubber powder is rubber powder of 60 meshes.

The cement is P.042.5 ordinary portland cement.

Embodiment 4

1) Preparation of the Waterborne Epoxy Emulsified Bitumen

According to the mass ratio of waterborne epoxy resin to a waterborne curing agent=100:100, the waterborne epoxy resin and the waterborne curing agent are selected for standby. The waterborne epoxy resin and the waterborne curing agent are simultaneously added in a container, and manually stirred continuously for 4 min to obtain a waterborne epoxy resin mixture.

According to the mass ratio of emulsified bitumen to the waterborne epoxy resin mixture to an emulsifying agent to a defoaming agent to a stabilizing agent=100:20:1.4:0.6:2.0, the emulsified bitumen and the waterborne epoxy resin mixture, the emulsifying agent, the defoaming agent and the stabilizing agent obtained from the above-mentioned preparation are selected for standby. The emulsified bitumen is first added in the container, and the pH is regulated with hydrochloric acid to be 6.5; and the waterborne epoxy resin mixture, the emulsifying agent, the defoaming agent and the stabilizing agent are mutually stirred and added simultaneously, and continuously mutually stirred for 3 min until the mixed liquid is uniform. A stator of a high-speed shearing machine is put into the mixed liquid, and the rotational speed is regulated as 500 rpm; and a switch is enabled to perform shearing for about 40 min to obtain waterborne epoxy emulsified bituminous emulsion. (Note: The storage time of the prepared emulsion shall not exceed 6 h)

2) Preparation of the Environmental Protection Cold Mixing Type Modulus-Adjustable Pavement Material According to the mass ratio of coarse aggregate to fine aggregate to fillers to cement to waterborne epoxy emulsified bitumen=100:80:12:8:16, the coarse aggregate, the fine aggregate, the fillers, the cement and the waterborne epoxy emulsified bitumen which is obtained from the above-mentioned preparation are selected for standby.

The coarse aggregate, the fine aggregate and the rubber powder are added in a stirring machine of the bituminous mixture and stirred for 90 s. After the waterborne epoxy emulsified bitumen is added, it is stirred for 90 s. Finally, the cement is added and stirred for 90 s to obtain the environmental protection cold mixing type modulus-adjustable pavement material.

The waterborne epoxy resin is waterborne epoxy resin HTW-609 produced by Suzhou Sirgel Specialty Resins Co., Ltd.

The waterborne curing agent is waterborne curing agent HTW-208 produced by Suzhou Sirgel Specialty Resins Co., Ltd.

The emulsified bitumen is cation slow-breaking emulsified bitumen produced by Tipco Asphalt (Public) Company Limited.

The emulsifying agent is BH-MM type emulsifying agent.

The defoaming agent is an ammonium salt cation surface active agent produced by Henan Daochun Chemical Technology Co., Ltd.

The stabilizing agent is glycol.

The coarse aggregate is granite, having a maximum nominal grain size of 26.5 mm.

The fine aggregate is granite, having a maximum nominal grain size of 4.75 mm.

The rubber powder is rubber powder of 80 meshes.

The cement is P.042.5 ordinary portland cement.

Refer to the following standards for the performance tests of all parameters of the cold mixing type modulus-adjustable pavement materials prepared and obtained by embodiment 1 to embodiment 4, and see Table 1 for parameter values:

① Rut test, for respectively testing dynamic stability at 60° C. and 70° C.: Standard Test Methods of Bitumen and Bituminous Mixtures for Highway Engineering JTG E20-2011 (T0719-2011);

② Water stability test, for testing residual immersion Marshall stability and freezing-thawing split strength ratio: Standard Test Methods of Bitumen and Bituminous Mixtures for Highway Engineering JTG E20-2011 (T0709-2011, T0729-2000);

③ Low-temperature bending test, for testing the ultimate bending strain at −10° C.: Standard Test Methods of Bitumen and Bituminous Mixtures for Highway Engineering JTG E20-2011 (T 0715-2011);

④ Shear Strength: A uniaxial penetration test from Bi Yufeng of Tongji University is adopted. Test conditions: ① sample molding: φ100 mm×100 mm; ② test temperature: 60° C.; keeping the temperature for 6 h; ③ loading rate: 1 mm/min.

⑤ Static Resilient Modulus: Standard Test Methods of Bitumen and Bituminous Mixtures for Highway Engineering JTG E20-2011 (T 0713-2000)

TABLE 1

Performance Tests of Embodiments

| Performance Parameters | Embodiment 1 | Embodiment 2 | Embodiment 3 | Embodiment 4 |
| --- | --- | --- | --- | --- |
| Dynamic stability at 60° C. (times/mm) | 1236 | 1504 | 1730 | 1896 |

TABLE 1-continued

Performance Tests of Embodiments

| Performance Parameters | Embodiment 1 | Embodiment 2 | Embodiment 3 | Embodiment 4 |
|---|---|---|---|---|
| Dynamic stability at 70° C. (times/mm) | 7264 | 9011 | 10058 | 12324 |
| Residual immersion Marshall stability | 92.6% | 94.2% | 94.6% | 94.5% |
| Freezing-thawing split strength ratio | 90.9% | 91.8% | 92.4% | 93.0% |
| Bending strain at −10° C. (με) | 2506 | 2636 | 2718 | 2701 |
| Shear strength (MPa) | 1.28 | 1.38 | 1.42 | 1.45 |
| Static resilient modulus (MPa) | 2200 | 2535 | 2966 | 3567 |

The present invention can be realized by all raw materials listed by the present invention, and the embodiments will not be individually listed herein. The present invention can be realized by upper and lower limits and values of range of all the raw materials and upper and lower limits of technological parameters (such as time, pH and the like), and the embodiments will not be individually listed herein.

We claim:

1. An environmental protection cold mixing modulus-adjustable pavement material, characterized by comprising the following mass ratios of materials:

| coarse aggregate: | 100 |
| fine aggregate: | 60 to 80 |
| fillers: | 8 to 12 |
| cement: | 4 to 8 |
| waterborne epoxy emulsified bitumen: | 8 to 16 | said waterborne epoxy emulsified bitumen comprises the following mass ratios of materials:

| emulsified bitumen | 100 |
| waterborne epoxy resin mixture | 4 to 20 |
| emulsifying agent | 0.6 to 1.4 |
| defoaming agent | 0.1 to 0.6 |
| stabilizing agent | 0.6 to 2.0; | said coarse aggregate is diorite, basalt, diabase, granite or limestone: said fine aggregate is diorite, basalt, diabase, granite or limestone; and said fillers are rubber powder;
wherein the waterborne epoxy emulsified bitumen is prepared by:
adding the emulsified bitumen in a container, and adjusting a pH with hydrochloric acid to be 5.0 to 6.5; mutually stirring and adding the waterborne epoxy resin mixture, the emulsifying agent, the defoaming agent and the stabilizing agent simultaneously, and mutually stirred continuously for 1 to 3 min until the mixed liquid is uniform;
suitor of a high-speed shearing machine is put into the mixed liquid, and the rotational speed is set as 350 to 500 rpm; and a switch is enabled to perform shearing for about 20 to 40 min to obtain the waterborne epoxy emulsified bituminous emulsion;
said coarse aggregate is diorite or basalt or diabase or granite or limestone, having a maximum nominal grain size of 26.5 mm; said fine aggregate is diorite or basalt or diabase or granite or limestone, having a maximum nominal grain size of 4.75 mm; said rubber powder is rubber powder of 40 to 80 meshes.

2. The environmental protection cold mixing modulus-adjustable pavement material of claim 1, characterized in that said defoaming agent is an ammonium salt cation surface active agent.

3. The environmental protection cold mixing modulus-adjustable pavement material of claim 1, characterized in that said stabilizing agent is polyvinyl alcohol or glycol.

4. A preparation method for the environmental protection cold mixing modulus-adjustable pavement material of claim 1, characterized by comprising the following steps:
(a) preparation of the waterborne epoxy emulsified bitumen
according to the mass ratio of waterborne epoxy resin to a waterborne curing agent=100:100; the waterborne epoxy resin and the waterborne curing agent are simultaneously added in a container, and manually stirred continuously for 2 to 4 min to obtain a waterborne epoxy resin mixture;
according to the mass ratios:

| emulsified bitumen | 100 |
| the waterborne epoxy resin mixture | 4 to 20 |
| emulsifying agent | 0.6 to 1.4 |
| defoaming agent | 0.1 to 0.6 |
| stabilizing agent | 0.6 to 2.0; | the emulsified bitumen is firstly added in the container, and the pH is regulated with hydrochloric acid to be 5.0 to 6.5; and the waterborne epoxy resin mixture, the emulsifying agent, the defoaming agent and the stabilizing agent are mutually stirred and added simultaneously, and mutually stirred continuously for 1 to 3 min until the mixed liquid is uniform;
a stator of a high-speed shearing machine is put into the mixed liquid, and the rotational speed is set at 350 to 500 rpm; and a switch is enabled to perform shearing for about 20 to 40 min to obtain the waterborne epoxy emulsified bitumen;
(b) preparation of the environmental protection cold mixing modulus-adjustable pavement material according to the mass ratios:

| coarse aggregate | 100 |
| fine aggregate | 60 to 80 |
| cement | 4 to 8 |
| the waterborne epoxy emulsified bitumen | 8 to 16 | the coarse aggregate and the fine aggregate are added in a stirring machine and stirred for 60 to 90 s;
stirring for 60 to 90 s after the waterborne epoxy emulsified bitumen is added;
adding the cement and stirring for 60 to 90 s to obtain the environmental protection cold mixing modulus-adjustable pavement material.

5. The preparation method for the environmental protection cold mixing modulus-adjustable pavement material of claim 4, characterized in that
said defoaming agent is an ammonium salt cation surface active agent;
said stabilizing agent is polyvinyl alcohol or glycol;
said coarse aggregate is diorite or basalt or diabase or granite or limestone, having a maximum nominal grain size of 26.5 mm; said fine aggregate is diorite or basalt or diabase or granite or limestone, having a maximum nominal grain size of 4.75 mm; and
said rubber powder is rubber powder of 40 to 80 meshes.

* * * * *